United States Patent
Hinkel

(10) Patent No.: US 9,100,564 B2
(45) Date of Patent: Aug. 4, 2015

(54) DIGITAL VIDEO CAMERA

(75) Inventor: Ralf Hinkel, Hoeringen (DE)

(73) Assignee: MOBOTIX AG, Winnweiler (DE)

(*) Notice: Subject to any disclaimer, the term of this patent is extended or adjusted under 35 U.S.C. 154(b) by 0 days.

(21) Appl. No.: 13/321,071

(22) PCT Filed: May 19, 2010

(86) PCT No.: PCT/DE2010/000554
§ 371 (c)(1),
(2), (4) Date: May 4, 2012

(87) PCT Pub. No.: WO2010/133210
PCT Pub. Date: Nov. 25, 2010

(65) Prior Publication Data
US 2012/0207440 A1   Aug. 16, 2012

(30) Foreign Application Priority Data
May 19, 2009   (DE) .......................... 10 2009 021 974

(51) Int. Cl.
*H04N 9/80* (2006.01)
*H04N 5/232* (2006.01)
(Continued)

(52) U.S. Cl.
CPC .......... *H04N 5/232* (2013.01); *G08B 13/19676* (2013.01); *H04N 5/23206* (2013.01); *H04N 5/772* (2013.01); *H04N 21/234363* (2013.01); *H04N 21/234381* (2013.01); *H04N 21/4223* (2013.01); *H04N 21/440263* (2013.01); *H04N 21/440281* (2013.01); *H04N 21/47202* (2013.01); *H04N 21/6581* (2013.01); *H04N 21/6587* (2013.01)

(58) Field of Classification Search
CPC .......... H04N 13/0011; H04N 13/0445; H04N 13/0404; H04N 13/0409; H04N 13/0456; H04N 13/0497; H04N 13/0434; H04N 13/0055; H04N 13/026; H04N 13/0022
See application file for complete search history.

(56) References Cited

U.S. PATENT DOCUMENTS

| 7,702,015 B2 * | 4/2010 | Richter et al. ........... 375/240.11 |
| 2002/0051061 A1 | 5/2002 | Peters et al. |

(Continued)

FOREIGN PATENT DOCUMENTS

| DE | 44 02 779 | 8/1995 |
| EP | 1 202 572 | 5/2002 |

(Continued)

OTHER PUBLICATIONS

Anonymus, "VideoIQ Introduces the VideoIQ iCVR," Press Release From VideoIQ, pp. 1/3-3/3, (Mar. 5, 2008) XP002602780.

(Continued)

*Primary Examiner* — Tat Chio
(74) *Attorney, Agent, or Firm* — Oblon, McClelland, Maier & Neustadt, L.L.P.

(57) ABSTRACT

The invention relates to a digital video camera comprising an image sensor that generates an image data raw stream, and comprising a memory for storing image data generated in response to the image data raw stream, and comprising a data output unit. In this case, it is provided that the data output unit is designed for outputting image data generated in response to the image data raw stream to the memory and for simultaneously outputting image data and for simultaneously outputting image data from the stored data from the camera to users.

13 Claims, 1 Drawing Sheet

(51) Int. Cl.
*G08B 13/196* (2006.01)
*H04N 5/77* (2006.01)
*H04N 21/2343* (2011.01)
*H04N 21/4223* (2011.01)
*H04N 21/4402* (2011.01)
*H04N 21/472* (2011.01)
*H04N 21/658* (2011.01)
*H04N 21/6587* (2011.01)

(56) References Cited

U.S. PATENT DOCUMENTS

| | | |
|---|---|---|
| 2002/0149682 A1 | 10/2002 | Kudo |
| 2003/0081844 A1* | 5/2003 | Sadeh ............ 382/233 |
| 2004/0174442 A1 | 9/2004 | Chosa |
| 2005/0174449 A1* | 8/2005 | Matsuzaka ........ 348/240.3 |
| 2005/0225652 A1 | 10/2005 | Kudo |
| 2006/0017562 A1* | 1/2006 | Bachelder ............ 340/531 |
| 2007/0104377 A1 | 5/2007 | Fukui |
| 2009/0219411 A1 | 9/2009 | Marman et al. |
| 2009/0219639 A1 | 9/2009 | Marman et al. |
| 2010/0171860 A1 | 7/2010 | Kudo |

FOREIGN PATENT DOCUMENTS

| | | |
|---|---|---|
| WO | 98 56182 | 12/1998 |
| WO | 2008 136007 | 11/2008 |
| WO | 2009 111377 | 9/2009 |

OTHER PUBLICATIONS

Anonymus, "VideoIQ Releases Latest Version of iCVR Management Software," Press Release From VideoIQ, pp. 1/2-2/2, (Apr. 1, 2009) XP002602781.

International Search Report Issued Oct. 15, 2010 in PCT/DE10/000554 Filed May 19, 2010.

German Office Action Issued Feb. 11, 2010 in Patent Application No. DE 10 2009 021 974.9 Filed May 19, 2009 (with computer generated translation).

* cited by examiner

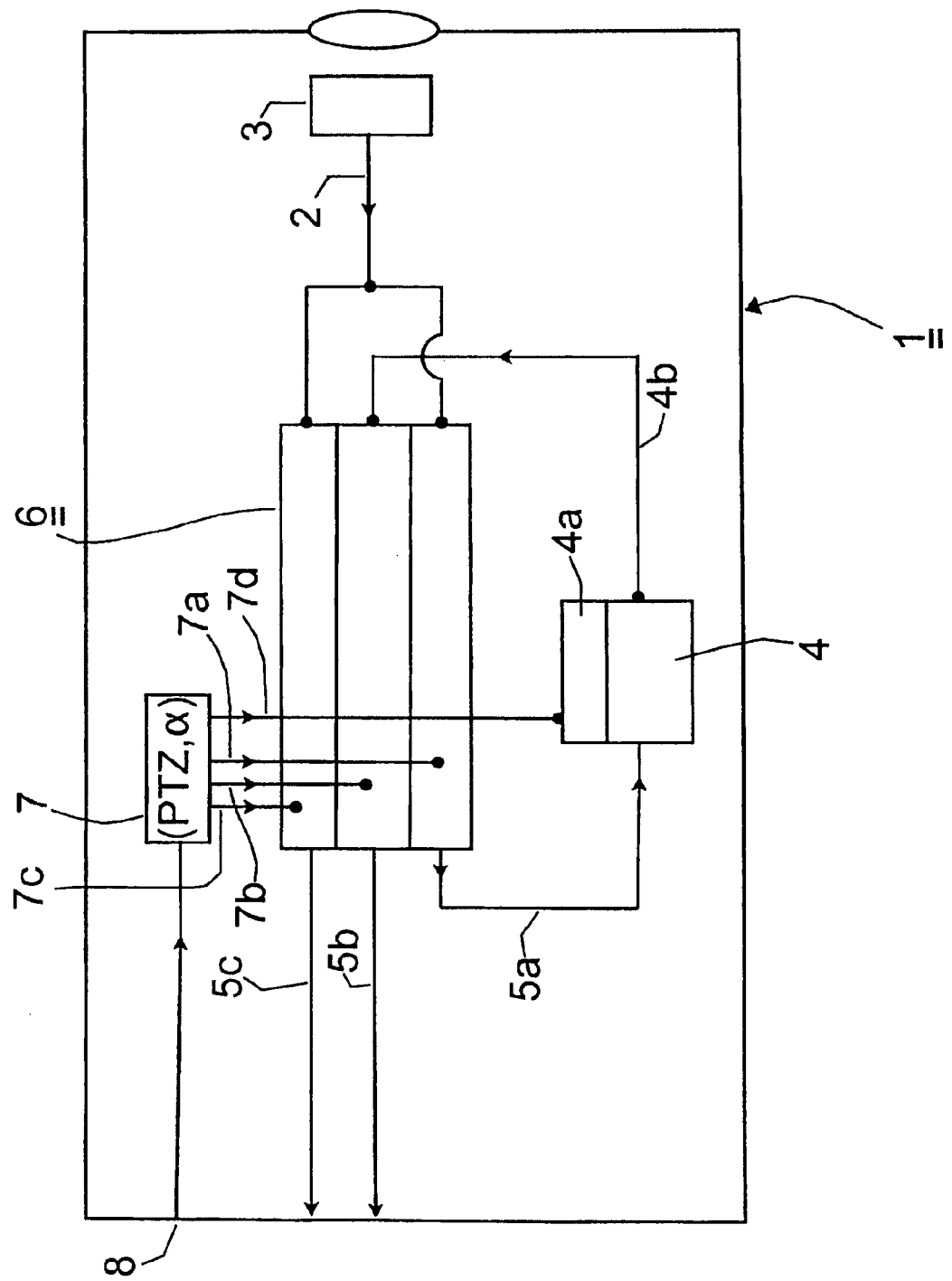

DIGITAL VIDEO CAMERA

The present invention is concerned with what is claimed in the preamble and thus relates to digital video cameras.

Digital video cameras are increasingly being used for surveillance purposes. In this case, the ever increasing quality of the images provided by the camera is advantageous. The high image quality is manifested in a high spatial resolution (pixel density), a high image refresh frequency and, if appropriate, a large dynamic range, that is to say a large range between dark and bright regions.

In the desired images having a very high quality, however, problems occur by virtue of the necessity for providing the images generated by a video camera for the user as well. This is critical particularly when there is only a narrowband connection between a user viewing and/or evaluating the images and the camera. Thus, the problems become particularly serious if surveillance is intended to be effected by a mobile communication path such as UMTS; in other applications, too, such as in surveillance control centers for example, in which data streams from a large number of cameras come together, surveillance is critical.

Digital video cameras according to the prior art in part already provide for storing images of an image sensor within the camera, which firstly ensures that recording is possible even in the event of disruption of the transmission line, and secondly allows the images to be accessed again later. In this case, in the prior art, image recording is effected with the same resolution and image refresh frequency as those of an image stream provided for live transmission from the camera for a user. The excessively high resolution can lead to problems during transmission, since it possibly requires an excessively high bandwidth; if the quality of the images transmitted live to an observer is reduced, however, at the same time the recording quality is also reduced, which makes it hugely difficult later to search for details in images.

Moreover, subsequently searching for details in images stored on the camera is further limited by the fact that often the camera, despite the search in stored images, is intended to continue to be used live for surveillance and the bandwidth available for transmission is furthermore limited.

There are already proposals for reducing the data provided from a digital video camera, for instance by transmitting only those image regions in which considerable changes have taken place. In this respect, reference is made in particular to the application PCT/EP 03/14795 in the name of the present applicant.

It is desirable to enable an improved search of images stored in the memory of the camera, without impairing the recording quality or transmission quality.

The object of the present invention is to provide something novel for industrial application.

This object is achieved in the manner claimed in independent form.

A first aspect of the present invention thus proposes a digital video camera comprising an image sensor that generates an image data raw stream, and comprising a memory for storing image data generated in response to the image data raw stream, and comprising a data output unit, wherein the data output unit is designed for outputting image data generated in response to the image data raw stream to the memory and for simultaneously outputting image data, in particular live image data and data having a reduced volume of data from the stored data to users.

Therefore, the invention initially proposes feeding the image data raw stream in a simple manner to different image generators, namely firstly to an image generator which generates the images to be stored from the image data raw stream, and secondly in order to provide a (live) image stream independently thereof. This allows the volume of image data which is to be handled in each case to be adapted in a targeted manner, without abandoning the possible advantages afforded in principle by modern video cameras. Thus, the image refresh frequency can be chosen to be low for storage purposes, which is typically sufficient because rapid movements are of secondary importance in typical surveillance scenarios such as at gas station pumps; at the same time, however, the image resolution can be chosen to be very high. On the other hand, for live observation, care can be taken to ensure that substantially non-jerky image transmission is effected, which avoids fatigue phenomena during observation.

However, it is not only the case that the dependence of the recorded image quality on that of the live stream is eliminated. Specifically, the invention has also recognized that in such a situation, without an additional significant increase, typically even completely without an increase in the camera power consumption, a third data stream can be provided, which enables an efficient use of the camera by means of mobile devices or at user terminals which are connected to the camera only via narrowband data lines. For this purpose, data are generated from the stored data and thus a volume of data already reduced by comparison with the image data raw stream, which brings about a lower power consumption corresponding to the already reduced volume of data. It should simultaneously be mentioned here that here although an image generator for outputting data having a reduced volume of data from the stored data can be provided which typically requires only a low transmission bandwidth, namely when a search image stream having a reduced resolution, dynamic range, color depth, image refresh frequency and/or having smaller segments, etc., is provided thereby, nevertheless this data generator in a preferred embodiment can also be used to provide images or image sequences having a high resolution, color depth, etc., particularly after images or image sequences identified as relevant on the basis of a previously effected search have been selected. During such outputting after a previously effected search of which images or image sequences or video sequences are intended to be output, typically no data volume or rate reduction will be effected by comparison with the (live) image stream, the live image data stream typically being output without being changed, while now the (full) data are output with respect to images identified as relevant; here, the live images are typically output with an unchanged data rate, while the data to be output from the archive in accordance with a previous search are output as, if appropriate, now a large volume of data with a possibly reduced data rate; waiting for the transmission of such archive images is generally acceptable. Alternatively, and/or additionally, the live image stream transmission could be interrupted for a short time and/or, given extreme total data channel bandwidth limitation, by changing the data compression, the image refresh frequency or the like, could itself be reduced for a short time in order thus to enable the archive images determined to be transmitted in an adequate time. A further possibility for reducing the volume of data consists in choosing a different compression rate and/or a different algorithm.

As is evident from the above, it is advantageous if, in a video camera according to the invention, the imaging sensor generates an image data raw stream comprising images having a high resolution, in particular a high number of pixels and/or a high dynamic range, because this is not associated with a significant increase in the bandwidth required for live use of the camera, but the often desired or required detail accuracy in stored images is achievable.

It is moreover likewise and/or additionally advantageous if, in this case, at the same time the data output unit is designed to generate images having a lower resolution than those of the image data raw stream; these images can be output as a live image stream. The live image stream is therefore typically provided with a data rate which is lower as a result of the reduction of the spatial resolution. It should be pointed out, moreover, that techniques for reducing the data rate in video image streams are known per se; thus, the applicant has already proposed image transmission methods wherein an updating of specific image regions is prioritized depending on changes detected therein in comparison with previous images; the applicant has also already proposed image transmission methods wherein individual defined or definable segments can be transmitted with a higher resolution. Reference should be made, inter alia, to the documents DE 102 61 501 A1, EP 1 614 080 and DE 10 2008 049 872. These documents are incorporated by reference within their full scope for disclosure purposes. Moreover, it should be pointed out that at points where the present application mentions (live) image streams, reference could also be made to video information, in particular to video information with additional sound; moreover, where a camera supplies not only mute image sequences but also a sound recording, it is possible to concomitantly store the sound. Moreover, particularly large volumes of data are not obtained in the course of sound storage. Thus, even where only low frame rates are employed for storage, such as, for example, images per second for storing high-resolution images, it is possible to record a continuous sound track. It should be mentioned in this context that the sound track can be transmitted, if appropriate, for search purposes, for instance in order to identify loud noises such as shots. Moreover, for search purposes, the sound track from a time period in which an individual transmitted image belongs can be transmitted in full.

It should furthermore be pointed out that during image data processing it is regularly necessary for a portion of the pixel information to be temporarily buffer-stored, for instance in order to be able to apply specific compression algorithms which can readily be used with the invention. However, this temporary buffer-storage is not regarded as storage within the meaning of the invention; this is because storage within the meaning of the invention can also be designated as archiving or archiving storage or storing archiving wherein a very large number of images, such as are acquired in the course of hours or days, are to be stored.

It is furthermore advantageous if, alternatively and/or additionally in a digital video camera according to the invention, the imaging sensor generates an image data raw stream comprising a fast image sequence. Fast means here, in particular, fast enough to be able to record expected movements with an image sequence which comprises a plurality of images and/or which enables a non-jerky representation; therefore, the live image stream can have, for example, 25 frames per second as image rate. In this case, however, a resolution typically need not be better than VGA standard, for example.

It is, moreover, likewise and/or additionally advantageous if, in this case, at the same time the data output unit is also designed to generate images having an image refresh frequency that is lower than that of the image data raw stream, as an image data stream having a reduced volume of data. Thus, for archiving it can suffice to record with an image rate of 4 frames per second. This generally suffices in order, even in the case of persons moving across the image, to be able to successfully detect details such as faces. In this case, the spatial resolution, that is to say the quantity of pixels, is preferably chosen to be as high as possible. The fact that, however, it is also possible to define regions that are uninteresting per se already for the recording, such as, for example, a background region not accessible to persons, and the fact that archiving or recording with a high or even highest possible resolution is not necessary either for such regions that are uninteresting per se, should be mentioned.

The images thus generated can then be archived, that is to say written to the camera-internal data memory. In such a case, the data output unit will generate the images taking the image data raw stream as a basis. However, it is also possible to design the data output unit to generate images having an image refresh frequency that is lower than that of the image data raw stream, as an image data stream having a reduced data rate on the basis of the archived images from the memory. In such a case, a further reduction can be effected in relation to the stored volume of data for instance by reducing the spatial resolution, that is to say the number of pixels, for example for those regions of an image in which typically no details of interest are to be expected. Moreover, if appropriate, an image can be cropped, which further reduces the required memory space. The fact that typically an image segment has to be archived only with a pan and tilt value being determined, that is to say that a zoom indication is not absolutely necessary, should be mentioned.

It is furthermore advantageous if, alternatively and/or additionally, the camera has an input for predetermining an image detail that can be transmitted in a data-reduced fashion, preferably for predetermining an image segment and/or an image segment magnification. It is thus possible to select which region of the image is intended to be transmitted for search purposes via a slow network, that is to say a network with narrowband transmission. Thus, it is possible, for instance, to choose an image region that contained an object that was damaged or stolen during a recording phase; the restriction to this region can be effected, for example, by predetermining PTZ (pan, tilt, zoom) parameters with which image details are determined. It is thus possible to avoid having to transmit largely uninteresting image regions.

Besides predetermining PTZ parameters, however, other possibilities are also provided for reducing the data rate. Thus, details determined by automatic image analysis, in particular faces, can be automatically recognized; one particularly preferred variant can detect features determined by means of OCR in the image in the case of gas station, parking lot, street surveillance, etc., in particular automobile license plates. With the reduced data stream, only the respective license plates then have to be transmitted, which, if necessary, does not even have to be effected as image data. If, this being preferred, image details are generated automatically, these can be used for archive indexing and can be communicated, if appropriate, for enquiries to the video camera. Thus, for instance, with respect to the images in the data memory of a camera observing a gas station pump, it is possible in each case to detect which automobile license plates can currently be seen in the image; this is possible automatically. It is then possible to retrieve images on which automobiles with a predetermined license plate (or license plate parts, such as specific districts) are detected. The fact that lists with the detected license plates can be communicated to an observer beforehand should be mentioned. Moreover, it can be provided that linkages with specific times can be performed. The archive is accordingly indexed in one preferred variant.

It should be mentioned, moreover, that in a video camera of the present invention, in a preferred configuration, the volume of data to be handled is reduced by virtue of the fact that those regions detected by the image sensor which are required neither for the live transmission of images nor for the image archiving are not processed; this can extend to specific sensor regions not even being read in the first place.

In order to make it possible that only a minimum volume of data is to be handled, in a preferred configuration of the invention, therefore, a block determining stage is provided, to which both the parameters determining the image segment of the live image generator and those-parameters which determine the segment of the images to be archived are fed. In response to these two sets of parameters, the maximum required block is then determined, which is read from the sensor. Therefore, only the data lying in this block are to be detected and/or processed. Therefore, the image sensor segment to be processed is determined from more than one set of parameters simultaneously.

It is furthermore advantageous if, alternatively and/or additionally, the digital video camera is provided such that the data output unit is designed to make stored images identifiable on the basis of the reduced data stream, wherein the video camera has an input in order to receive signals which can be used to identify images from the memory which are desired by a user. In response to the received signals identifying images in the memory, it is then possible, for instance, to provide images having an increased resolution and/or less highly cropped images and/or images comprising a faster image sequence, in particular as an image stream. The transmission of these images via a narrowband data channel or a highly loaded data channel is then likewise slow, but is readily acceptable in view of the archive search effected before the transmission of the high-resolution images that are actually important.

It is also preferred, alternatively and/or additionally, if, in the case of a digital video camera as described above, the data output unit is designed to store an image data stream in the memory and simultaneously to output to users an image data stream having a reduced volume of data and at least one image data stream output for a user and having a different spatial and/or temporal and/or dynamic resolution than that of the image data stored in the memory. Therefore, with the third data stream for that user whose bandwidth is limited, the reduced data stream is explicitly defined as image data stream, to be precise as image data stream generated taking the stored image data stream as a basis. This data stream makes it possible to utilize a data rate or volume reduction already effected for the storage.

It should be pointed out once again here that images for search purposes can be output individually or as a sequence and with or without sound, that is to say that the search image generator is also able to generate video data streams from the memory content. Moreover, it should be noted that the search image generator, when a specific individual image or a specific image sequence has been identified as relevant, can transmit this individual image or this specific image sequence with the desired resolution.

Moreover, it should be pointed out that the user who receives a live image data stream can be identical to that user who receives the further reduced archive data stream. This generally holds true for the application of the invention in all its aspects, unless noted otherwise. Nevertheless, this is not mandatory, however; thus, for instance, a live image transmission to a monitoring control center can be effected. As soon as it is unclear to the monitoring personnel active there whether there is a risk situation, a superior who can be reached via a UMTS cellular phone, for instance, can be alerted in order that said superior obtains specific image information from the memory. It would be also possible for the monitoring personnel already to determine—for example by predetermining the PTZ parameters—which image segments and/or time ranges are intended to be transmitted to a superior or the like; if necessary, it is also possible to initiate the transmission on a different channel such as a mobile radio link.

It is preferred, moreover, that, alternatively and/or additionally, the data output unit is designed to output as at least one image data stream a live image data stream having a high resolution and a high image refresh frequency, preferably having a higher image refresh frequency than in the stored data record, but having a preferably lower resolution.

Consequently, a digital surveillance camera is proposed, inter alia, wherein three image generators are provided, namely an image generator for generating a live image stream, an image generator for archiving the image stream and a generator for outputting a search image stream, wherein all image and/or video streams are configurable according to user stipulations, in particular in such a way that the image stream to be archived is defined beforehand, for example when the camera is started up, while the other two image streams can be configured in the course of operation, for example online by a user.

The invention is described below merely by way of example with reference to the drawing, which illustrates by:

FIG. 1 an arrangement according to the present invention.

According to FIG. 1, a digital video camera 1, designated generally by 1, comprising an image sensor 3, which generates an image data raw stream 2, and a memory 4 for storing image data 5 generated in response to the image data raw stream 2 further comprises a data output unit 6, wherein the data output unit is designed for outputting image data 5a generated in response to the image data raw stream to the memory 4 and for simultaneously outputting image data 5b and data 5c having a typically reduced volume of data from the stored data to users.

In the present exemplary embodiment, the digital video camera 1 is a surveillance camera that is fixedly installed for the continuous monitoring of an object, here—assumed for explanation purposes—a gas station pump (not shown). The images of the digital video camera 1 are provided firstly for allowing live surveillance, here of the pump from the cash desk, and secondly for archiving the images for later retrieval for a limited period.

As image data raw stream 2, the image data raw stream is generated from spatially high-resolution images, that is to say images having a very large number of pixels and a high image refresh frequency, in the video camera 1 with the image sensor 3. On the filing date, images having QXGA resolution are regarded as a very large number of pixels; the image refresh frequency is chosen with a magnitude such that images can be viewed in a non-jerky manner, in the present example therefore for example 25 frames per second (fps). However, the indications concerning the spatial resolution and concerning the image refresh frequency are not restrictive and it will be apparent that as the technology advances, better resolutions, higher image refresh frequencies and, if appropriate, a larger dynamic range can be obtained without high costs. It should be mentioned, moreover, that, in the present case, the dynamic range of the images, that is to say the maximally readily discernible bright-dark contrasts, and the associated possibilities for reducing the data rate or volume by limiting the transmitted bright-dark contrasts or by high dynamic range compression methods, will not be discussed any further, but such possibilities nevertheless exist and are known per se.

The image sensor 3 outputs the image data raw stream 2 to the data output unit 6, which contains three independent image generators 6a, 6b and 6c. In this case, the image data raw stream 2 is fed only to the image generators 6a and 6c.

The image generator 6a is designed to generate from the image data raw stream 2 a data stream 5a, which is fed the into the memory 4 serving as a camera-internal image archive. Furthermore, the image generator 6a is designed to index the data stream to be fed into the memory 4 such that individual images associated with specific indexes can be found again with the aid of the index. The corresponding indexes are provided for storage in a memory area 4a of the memory 4 and can refer, for example to the addresses at which the data of a respective image begin.

By way of example, the recording time or an automatically recognized image feature shall be mentioned as indexes provided by the image generator 6a. It should be mentioned that the recording does not have to run continuously, but rather can be initiated, for example, by an image analysis which identifies that an object such as an automobile moving past the pump has entered the image. Moreover, it should be mentioned that the image memory 4 is preferably cyclically overwriteable, but that the cyclic overwriting can be prevented if necessary in the embodiment illustrated here, this not being mandatory, however. Attention should be drawn to the possibility of determining indexes such as automobile license plates by means of automatic image analysis.

The image generator 6a is designed to generate, as data stream 5a, a data stream having, with respect to the image data raw stream 2, a lower image refresh frequency, but the same spatial resolution, that is to say number of pixels.

The image generator 6c, to which the image data raw stream 2 is likewise fed, is designed to generate an image data stream 5c having an image refresh frequency of the same magnitude as that of the image data raw stream 2, but the images contained in the image data stream 5c (typically, namely in particular during the search for specific important individual images or specific image sequences) have a lower spatial resolution than the images of the image data raw stream 2.

The memory 4 is formed in the present case as a cyclically overwriteable dual port memory, which can be written to while data are simultaneously being read out. The data from the memory pass via a data line 4b to the image data input of the image generator 6b of the data output unit 6. The image generator 6b is designed to output images having reduced resolution by comparison with the high spatial resolution of the stored images at its output 5b.

The data output 5c is led (not illustrated) via one data channel to a user who evaluates the live images. The data output 5b is led via a (different, here in particular more narrowband, that is to say slower) data channel to a (here: different) user who searches for specific images in the memory 4.

The data output unit 6 is now assigned a controller 7, which can be used to define for each of the three image generators 6a, 6b, 6c independently of one another which regions of an image in the respective image stream 5a, 5b and 5c generated by the image generator 6a, 6b, 6c are intended to be represented or which image refresh frequencies are desired; the fact that other parameters such as compression, etc., are preferably likewise selectable should be emphasized here.

For this purpose, the controller 7 is connected to an input 8, at which the corresponding indications can be input. The input 8 and also the outputs 5b and 5c can be defined as a standard interface and enable communication with the camera by means of protocols such as TCP/IP, WLAN, UMTS etc.

The controller 7 is designed such that, for the live image generator 6c, an image segment can be predetermined by means of a first set of pan, tilt and zoom parameters that are fed to the image generator 6c via a line 7c.

Furthermore, the controller 7 is designed to prescribe to the image generator 6b for the archive search a second set of pan, tilt and zoom parameters that are fed to the image generator 7b via a line 7b. The second set of pan, tilt and zoom parameters is totally different from the first set. The second set of pan, tilt and zoom parameters defines which segment of the stored images is intended to be output in the image stream 5b.

At the same time, the controller 7 also controls the outputting 4b of image data from the memory to the image generator 6b, wherein it is possible to define the index alpha starting from which images from the memory 4 are intended to be fed to the image generator 6b.

By means of the controller 7, moreover, it is also possible to stipulate that specific image areas are not intended to be concomitantly stored, but rather trimmed away. For this purpose, a third set of pan, tilt and zoom parameters can be fed to the image generator 6a via the line 7b. The third set of pan, tilt and zoom parameters is independent of the other two sets of pan, tilt and zoom parameters.

The controller 7 furthermore comprises a block determining stage (not shown), which, on the basis of the sets of parameters, determines the maximum required block size which has to be read from the image sensor for the image raw data. This maximum required block size is fed to the image sensor or the electronic unit assigned thereto, whereupon only those image data which lie in the maximum required image block are read from the image sensor. It should be pointed out here that the image data read can be slightly larger than predetermined by the image segments actually desired by the observers, since it is possibly necessary for technical reasons to read an entire row or line of sensor elements; this is not understood to be a deviation from the concept of maximum block formation and will not be further mentioned separately hereinafter.

It should also be pointed out that specific parameters, for example the parameters for archiving, can be password-protected and can be stored in a nonvolatile or battery-buffered area, in order that an undesired adjustment does not occur during a power failure or in some other way.

During use, an image data raw stream 2 is generated in the video camera 1 with the image sensor 3 and is fed to the image generators 6a and 6c, which simultaneously find out information about the relevant image segments via the controller 7 and lines 7a and 7c.

In this case, image generator 6c generates a live image data stream having a low resolution and a high image refresh frequency for direct surveillance.

The independent image generator 6a generates an image data stream to be stored in the memory 4 and having a high resolution and a low image refresh frequency and also data which index this image data stream, which are stored in the memory area 4a.

The image generator 6b is initially out of operation until a user wants to conduct a search as to whether a specific event can be found in the image data archived in the memory 4.

For this purpose, the user prescribes at the input 8 an initial parameter alpha for the search, for example the recording time of the first image of interest. With this initial parameter alpha, an image is determined, which is fed to the image generator 6b via line 4b.

By prescribing a set of pan, tilt and zoom parameters, the user searching the archive can then simultaneously stipulate which image segment is transmitted to said user. This reduces the volume of data that is to be transmitted for search purposes not only below that of the image data raw stream but also below that of the images stored in the memory.

As soon as the searching user has identified an image possibly relevant to said user in the reduced data stream 5b forwarded to said user via a more narrowband data channel, said user will request the image or an image data stream containing the latter with higher resolution or more completely from the memory.

The search is thus possible without impairing a live image stream and whilst enabling access to high-resolution images also in the case of bandwidth-limited (search) data channels.

It should be mentioned, moreover, that the image generator stages, maximum block determining stages, etc., as described here can be realized by software modules which can be processed jointly on one and the same processor or a plurality of processors. It should furthermore be mentioned that, if appropriate and preferably, without this being mentioned separately, the image size of images output and/or of archived images is selectable, for example between standard formats such as VGS, SVGA, HD etc.

Furthermore, it should be mentioned that, if appropriate, more than in each case only one user searching the image data archive can receive an output from the camera. For this purpose, a plurality of (search) image generators can be provided or implemented and/or the users are alternately supplied with data, images or image parts, which slows down the output for the individual searching user, but nevertheless limits the camera loading as a result of searches and the subsequent outputting of the data. Therefore, the invention is not restricted either in terms of the disclosure or in terms of the scope of protection to a maximum of one (search) generator being provided, but rather is considered to be realized if at least one corresponding output stage, etc., is provided.

The invention claimed is:

1. A digital surveillance camera comprising:
an image sensor configured to generate an image data raw stream;
a memory configured to store image data generated in response to receiving the image data raw stream;
a data input device configured to receive predetermination information including a plurality of image parameter sets, each of the plurality of image parameter sets being independent from each other and including pan tilt and zoom parameters so that each of the plurality of image parameter sets designates image segments or image details relating to a different image;
a determination unit configured to determine, in response to receiving the plurality of image parameter sets, a maximum block to be read out from the image sensor for the generation of the image data raw stream so that other image data that is registered with the image sensor and that does not lie in the maximum block is not read out from the image sensor, the maximum block being determined by two independent image parameter sets; and
a data output device configured to output the image data, which is generated in response to receiving the image data raw stream, to the memory, and to simultaneously output the image data at two different resolutions, the two different resolutions including a first resolution, which is a relatively higher resolution and a second resolution, which is a relatively lower resolution,
wherein first image data of the first resolution is output to a user connected to the digital surveillance camera via a bandwidth-limited connection,
wherein second image data of the second resolution has a frame rate sufficiently high to avoid jerky reproduction or to compensate for expected movement in order to avoid fatigue phenomena during observation, and
wherein the first image data of the first resolution has a relatively lower frame rate and is based on the image data stored in the memory, the first image data of the first resolution being transmitted from the memory to the user in response to a request from the user after transmission of compressed image data from the memory.

2. The digital video surveillance camera as claimed in claim 1, wherein
the image sensor generates the image data raw stream having a relatively high resolution with a relatively high number of pixels and/or a relatively high dynamic range, and
the data output device is further configured to convert the image data raw stream to the second image data of the second resolution having the relatively lower resolution.

3. The digital surveillance camera as claimed in claim 1, wherein the data output device is configured to generate images having a lower resolution than a resolution of the image data raw stream.

4. The digital surveillance camera as claimed in claim 1, wherein the image sensor generates the image data raw stream to comprise a fast image sequence.

5. The digital surveillance camera as claimed in claim 1, wherein the data output device is configured to generate images having an image refresh frequency that is lower than an image refresh frequency of the image data raw stream, and/or to generate images having a higher degree of compression than a degree of compression of the image data raw stream and/or to generate images using a different encoding algorithm than an encoding algorithm used for the image data raw stream, as an image data stream having a reduced volume of data.

6. The digital surveillance camera as claimed in claim 1, wherein the data output device is configured to make stored images identifiable based on a reduced data stream, wherein the digital surveillance camera further comprises an input configured to
receive signals identifying images from the memory, and
in response to the received signals identifying images in the memory, to provide images having an increased resolution and/or less highly cropped images and/or images comprising a faster image sequence as an image stream.

7. The digital surveillance camera as claimed in claim 1, wherein the data output device is configured to store the image data in the memory and simultaneously output to users an image data stream having a reduced volume of data and at least one image data stream having a different spatial and/or temporal and/or dynamic resolution than that of the image data stored in the memory.

8. The digital surveillance camera as claimed in claim 1, wherein the data output device is configured to output, as at least one image data stream, a live image data stream having a high resolution and a high image refresh frequency, the live image data stream having a higher image refresh frequency and a lower resolution than the stored image data.

9. The digital surveillance camera as claimed in claim 1, wherein the maximum block is defined as an area of the image data and only data included in the maximum block is detected and/or processed.

10. The digital surveillance camera as claimed in claim 1, wherein the generation of the image data raw stream includes discarding any portions of captured data not within the maximum block.

11. The digital surveillance camera as claimed in claim 1, wherein the second image data of the second resolution corresponds to live images transmitted to another user.

12. The digital surveillance camera as claimed in claim 1, wherein one of the two independent image parameter sets determines image segments or image details corresponding to the first image data of the first resolution and another one of the two independent image parameter sets determines image segments or image details corresponding to the second image data of the second resolution.

13. A method comprising:
  generating an image data raw stream via an image sensor in a digital surveillance camera;
  generating image data in response to receiving the image data raw stream;
  receiving predetermination information including a plurality of image parameter sets, each of the plurality of image parameter sets being independent from each other and including pan tilt and zoom parameters so that each of the plurality of image parameter sets designates image segments or image details relating to a different image;
  determining, in response to receiving the plurality of image parameter sets, a maximum block to be read out from the image sensor for the generation of the image data raw stream so that other image data that is registered with the image sensor and that does not lie in the maximum block is not read out from the image sensor, the maximum block being determined by two independent image parameter sets; and
  outputting the image data, which is generated in response to receiving the image data raw stream, to the memory, and simultaneously outputting the image data at two different resolutions, the two different resolutions including a first resolution, which is a relatively higher resolution and a second resolution, which is a relatively lower resolution,
  wherein first image data of the first resolution is output to a user connected to the digital surveillance camera via a bandwidth-limited connection,
  wherein second image data of the second resolution has a frame rate sufficiently high to avoid jerky reproduction or to compensate for expected movement in order to avoid fatigue phenomena during observation, and
  wherein the first image data of the first resolution has a relatively lower frame rate and is based on the image data stored in the memory, the first image data of the first resolution being transmitted from the memory to the user in response to a request from the user after transmission of compressed image data from the memory.

* * * * *